(12) United States Patent
Faitelson et al.

(10) Patent No.: US 10,320,798 B2
(45) Date of Patent: *Jun. 11, 2019

(54) SYSTEMS AND METHODOLOGIES FOR CONTROLLING ACCESS TO A FILE SYSTEM

(71) Applicant: VARONIS SYSTEMS, INC., New York, NY (US)

(72) Inventors: Yakov Faitelson, New York, NY (US); Ohad Korkus, New York, NY (US)

(73) Assignee: VARONIS SYSTEMS, INC., New York, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/012,176

(22) Filed: Feb. 1, 2016

(65) Prior Publication Data
US 2016/0149925 A1    May 26, 2016

Related U.S. Application Data

(63) Continuation of application No. 13/771,527, filed on Feb. 20, 2013, now Pat. No. 9,251,363.

(51) Int. Cl.
*G06F 16/11* (2019.01)
*G06F 16/176* (2019.01)
(Continued)

(52) U.S. Cl.
CPC ............ *H04L 63/102* (2013.01); *G06F 16/11* (2019.01); *G06F 16/1774* (2019.01);
(Continued)

(58) Field of Classification Search
CPC ............ G06F 17/3007; G06F 21/6218; G06F 21/604; G06F 17/30171; G06F 2221/2141;
(Continued)

(56) References Cited

U.S. PATENT DOCUMENTS 5,465,337 A    11/1995 Mukherjee
5,729,734 A    3/1998 Parker et al.
(Continued)

FOREIGN PATENT DOCUMENTS

CN        1588889 A     3/2005
CN       101379507      3/2009
(Continued)

OTHER PUBLICATIONS

USPTO NFOA dated Sep. 29, 2014 in connection with U.S. Appl. No. 13/771,527.
(Continued)

*Primary Examiner* — Jorge A Casanova
(74) *Attorney, Agent, or Firm* — Ladas & Parry LLP

(57) ABSTRACT

A method for controlling access to a file system having data elements, including the steps of maintaining a record of respective actual accesses by users of the file system to the data elements, defining a proposed removal of a set of the users from a superset of the users, wherein members of the superset have common access privileges to a portion of the data elements, and wherein following an implementation of the proposed removal, members of the set retain respective proposed residual access permissions, ascertaining, prior to the implementation of the proposed removal, that at least one of the respective actual accesses are disallowed to the members of the set, or to non-members of the set having actual access profiles which are similar to the actual access profiles of the members of the set, by the respective proposed residual access permissions, and generating an error indication, responsively to the ascertaining.

8 Claims, 3 Drawing Sheets

(51) Int. Cl.
  *G06F 21/60* (2013.01)
  *G06F 21/62* (2013.01)
  *H04L 29/06* (2006.01)

(52) U.S. Cl.
  CPC ........ *G06F 21/604* (2013.01); *G06F 21/6218* (2013.01); *H04L 63/101* (2013.01); *G06F 2221/2101* (2013.01); *G06F 2221/2141* (2013.01)

(58) Field of Classification Search
  CPC ......... G06F 2221/2101; G06F 16/1774; G06F 16/11; H04L 63/102; H04L 63/101
  USPC .................................. 707/781, 783, 785, 786
  See application file for complete search history.

(56) References Cited

U.S. PATENT DOCUMENTS

| | | | |
|---|---|---|---|
| 5,761,669 A | 6/1998 | Montague et al. | |
| 5,889,952 A | 3/1999 | Hunnicutt et al. | |
| 5,899,991 A | 5/1999 | Karch | |
| 6,023,765 A | 2/2000 | Kuhn | |
| 6,178,505 B1 | 1/2001 | Schneider et al. | |
| 6,308,173 B1 | 10/2001 | Glasser et al. | |
| 6,338,082 B1 | 1/2002 | Schneider | |
| 6,393,468 B1 | 5/2002 | McGee | |
| 6,574,630 B1 | 6/2003 | Augustine et al. | |
| 6,772,350 B1 | 8/2004 | Belani et al. | |
| 6,928,439 B2 | 8/2005 | Satoh | |
| 6,993,137 B2 | 1/2006 | Fransdonk | |
| 6,996,577 B1 | 2/2006 | Kiran et al. | |
| 7,007,032 B1 | 2/2006 | Chen et al. | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,124,272 B1 | 10/2006 | Kennedy et al. | |
| 7,219,234 B1 | 5/2007 | Ashland et al. | |
| 7,305,562 B1 | 12/2007 | Bianco et al. | |
| 7,401,087 B2 | 7/2008 | Copperman et al. | |
| 7,403,925 B2 | 7/2008 | Schlesinger et al. | |
| 7,421,740 B2 | 9/2008 | Fey et al. | |
| 7,444,655 B2 | 10/2008 | Sardera | |
| 7,529,748 B2 | 5/2009 | Wen et al. | |
| 7,555,482 B2 | 6/2009 | Korkus | |
| 7,568,230 B2 | 7/2009 | Lieberman et al. | |
| 7,596,571 B2 | 9/2009 | Sifry | |
| 7,606,801 B2 | 10/2009 | Faitelson et al. | |
| 7,716,240 B2 | 5/2010 | Lim | |
| 7,743,420 B2 | 6/2010 | Shulman et al. | |
| 7,849,496 B2 | 12/2010 | Ahern et al. | |
| 7,983,264 B2 | 7/2011 | Etheridge | |
| 8,239,925 B2 | 8/2012 | Faitelson et al. | |
| 8,438,611 B2 | 5/2013 | Faitelson et al. | |
| 8,438,612 B2 | 5/2013 | Faitelson et al. | |
| 8,533,787 B2 | 9/2013 | Faitelson et al. | |
| 8,561,146 B2 | 10/2013 | Faitelson et al. | |
| 9,251,363 B2 | 2/2016 | Faitelson et al. | |
| 2002/0002557 A1 | 1/2002 | Straube et al. | |
| 2002/0026592 A1 | 2/2002 | Gavrila et al. | |
| 2002/0174307 A1 | 11/2002 | Yoshida et al. | |
| 2003/0048301 A1 | 3/2003 | Menninger | |
| 2003/0051026 A1 | 3/2003 | Carter et al. | |
| 2003/0074580 A1 | 4/2003 | Knouse et al. | |
| 2003/0188198 A1 | 10/2003 | Holdsworth et al. | |
| 2003/0231207 A1 | 12/2003 | Huang | |
| 2004/0030915 A1 | 2/2004 | Sameshima et al. | |
| 2004/0123183 A1 | 6/2004 | Tripathi et al. | |
| 2004/0186809 A1 | 9/2004 | Schlesinger et al. | |
| 2004/0205342 A1 | 10/2004 | Roegner | |
| 2004/0249847 A1 | 12/2004 | Wang et al. | |
| 2004/0254919 A1 | 12/2004 | Giuseppini | |
| 2004/0260952 A1 | 12/2004 | Newman et al. | |
| 2004/0267729 A1 | 12/2004 | Swaminathan et al. | |
| 2005/0044399 A1 | 2/2005 | Dorey | |
| 2005/0065823 A1 | 3/2005 | Ramraj et al. | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0187937 A1 | 8/2005 | Kawabe et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2005/0278785 A1 | 12/2005 | Lieberman | |
| 2006/0064313 A1 | 3/2006 | Steinbarth et al. | |
| 2006/0075503 A1 | 4/2006 | Bunker et al. | |
| 2006/0090208 A1 | 4/2006 | Smith | |
| 2006/0184459 A1 | 8/2006 | Parida | |
| 2006/0184530 A1 | 8/2006 | Song et al. | |
| 2006/0271523 A1 | 11/2006 | Rookier et al. | |
| 2006/0277184 A1 | 12/2006 | Faitelson et al. | |
| 2006/0288050 A1 | 12/2006 | Wilson | |
| 2006/0294578 A1 | 12/2006 | Burke et al. | |
| 2007/0011091 A1 | 1/2007 | Smith | |
| 2007/0033340 A1 | 2/2007 | Tulskie et al. | |
| 2007/0061487 A1 | 3/2007 | Moore et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0121501 A1 | 5/2007 | Bryson | |
| 2007/0143859 A1 | 6/2007 | Ogi et al. | |
| 2007/0156659 A1 | 7/2007 | Lim | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0214497 A1 | 9/2007 | Montgomery et al. | |
| 2007/0244899 A1 | 10/2007 | Faitelson et al. | |
| 2007/0261121 A1 | 11/2007 | Jacobson | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0031447 A1 | 2/2008 | Geshwind et al. | |
| 2008/0034205 A1 | 2/2008 | Alain et al. | |
| 2008/0034402 A1 | 2/2008 | Botz et al. | |
| 2008/0091682 A1 | 4/2008 | Lim | |
| 2008/0097998 A1 | 4/2008 | Herbach | |
| 2008/0115076 A1 | 5/2008 | Frank et al. | |
| 2008/0162707 A1 | 7/2008 | Beck et al. | |
| 2008/0172720 A1 | 7/2008 | Botz et al. | |
| 2008/0184330 A1 | 7/2008 | Lal et al. | |
| 2008/0209535 A1 | 8/2008 | Athey et al. | |
| 2008/0256619 A1 | 10/2008 | Neystadt et al. | |
| 2008/0270462 A1 | 10/2008 | Thomsen | |
| 2008/0271157 A1* | 10/2008 | Faitelson ............ G06F 21/6218 726/27 |
| 2009/0019516 A1 | 1/2009 | Hammoutene et al. | |
| 2009/0031418 A1 | 1/2009 | Matsuda et al. | |
| 2009/0100058 A1 | 4/2009 | Fartelson et al. | |
| 2009/0119298 A1 | 5/2009 | Faitelson et al. | |
| 2009/0265780 A1 | 10/2009 | Korkus et al. | |
| 2011/0010758 A1 | 1/2011 | Faitelson et al. | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0184989 A1 | 7/2011 | Faitelson et al. | |
| 2011/0296490 A1 | 12/2011 | Faitelson et al. | |
| 2012/0054283 A1 | 3/2012 | Korkus et al. | |
| 2012/0271853 A1 | 10/2012 | Faitelson et al. | |
| 2012/0271855 A1 | 10/2012 | Faitelson et al. | |
| 2012/0272294 A1 | 10/2012 | Faitelson et al. | |
| 2012/0291100 A1 | 11/2012 | Faitelson et al. | |
| 2013/0117314 A1 | 5/2013 | Faitelson et al. | |
| 2013/0117315 A1 | 5/2013 | Faitelson et al. | |
| 2014/0236999 A1 | 8/2014 | Faitelson et al. | |

FOREIGN PATENT DOCUMENTS

| | | |
|---|---|---|
| EP | 1248178 B1 | 10/2002 |
| GB | 2441458 B | 2/2010 |
| JP | 2004-027705 A | 1/2004 |
| JP | 2005-267237 A | 9/2005 |
| JP | 2010-287171 A | 12/2010 |
| JP | 4-988724 B | 5/2012 |
| JP | 5-108155 B2 | 10/2012 |

(56) References Cited

FOREIGN PATENT DOCUMENTS

| WO | 2006/131906 A2 | 12/2006 |
|---|---|---|
| WO | 2011/030324 A1 | 3/2011 |
| WO | 2011/092684 A1 | 8/2011 |
| WO | 2011/092685 A | 8/2011 |
| WO | 2011/092686 A1 | 8/2011 |
| WO | 2011/148364 A1 | 12/2011 |
| WO | 2011/148376 A2 | 12/2011 |
| WO | 2011/148377 A1 | 12/2011 |
| WO | 2012/090189 A1 | 7/2012 |
| WO | 2012/101620 A1 | 8/2012 |
| WO | 2012/101621 A | 8/2012 |
| WO | 2012/143920 A2 | 10/2012 |
| WO | 2013/150507 A2 | 10/2013 |

OTHER PUBLICATIONS

USPTO FOA dated Mar. 6, 2015 in connection with U.S. Appl. No. 13/771,527.
USPTO AA dated Jun. 24, 2015 in connection with U.S. Appl. No. 13/771,527.
USPTO NOA dated Oct. 15, 2015 in connection with U.S. Appl. No. 13/771,527.
U.S. Appl. No. 60/688,486, filed Jun. 7, 2005.
U.S. Appl. No. 60/792,091, filed Apr. 14, 2006.
U.S. Appl. No. 61/240,726, filed Sep. 9, 2009.
U.S. Appl. No. 61/348,806, filed May 27, 2010.
U.S. Appl. No. 61/477,662, filed Apr. 21, 2011.
Sahadep De, et al; "Secure Access Control in a Multi-user Geodatabase", available on the Internet at the URL http://www.10.qiscafe.com 2005, 10 pages.
Findutils; GNU Project—Free Software Foundation (FSF), 3 pages, Nov. 2006.
Genunix; "Writing Filesystems—VFS and Vnode Interfaces", 5 pages, Oct. 2007.
S.R. Kleiman; "Vnodes: An Architecture for Multiple File System Types in Sun UNIX", USENIX Association: Summer Conference Proceedings, Atlanta 1986; 10 pages.
Sara C. Madeira, et al; "Biclustering Algorithms for Biological Data Analysis: A Survey". Mar. 2004; http://www.cs.princeton.edu/courses/archive/spr05/cos598E/bib/bicluster.pdf.
Sara C. Madeira; Clustering, Fuzzy Clustering and Biclustering: An Overview; pp. 31-53; Jun. 27, 2003.
Varonis; "Accelerating Audits with Automation: Understanding Who's Accessing Your Unstructured Data", 7 pages Oct. 8, 2007.
Varonis; "Entitlement Reviews: A Practitioner's Guide", 2007.
Varonis; "White Paper: The Business Case for Data Governance", dated Mar. 27, 2007 8 pages; Preventia; www.preventia.co.
Edgar Weippl, et al; "Content-based Management of Document Access Control", 14th International Conference on Applications of Prolog (INAP), 2001, 9 pages.
Alex Woodie; "Varonis Prevents Unauthorized Access to Unstructured Data", Four Hundred Stuff, vol. 7, No. 9, Jul. 31, 2007, 6 pages.
A List of database tables in DatAdvantage 2.7, Feb. 6, 2007.
A List of database tables in DatAdvantage 3.0, Jun. 20, 2007.
DatAdvantage User Guide by Varonis, Version 1.0, Aug. 30, 2005, 71 pages.
DatAdvantage User Guide by Varonis, Version 2.0, Aug. 24, 2006, 118 pages.
DatAdvantage User Guide by Varonis, Verion 2.5, Nov. 27, 2006, 124 pages.
DatAdvantage User Guide by Varonis, Version 2.6, Dec. 15, 2006, 127 pages.
DatAdvantage User Guide by Varonis, Version 2.7, Feb. 6, 2007, 131 pages.
DatAdvantage User Guide by Varonis, Version 3.0, Jun. 20, 2007, 153 pages**document in 2 parts due to size**.
English Translation of German Office Action dated Sep. 14, 2012; Appln. No. 11 2006 001 378.5.
Great Britain Office Action dated Oct. 16, 2009; Appln. No. 0723218.4.
English Translation of Japanese Office Action dated May 31, 2011; Appln. No. 2008-515373.
English Translation of Japanese Office Action dated Sep. 27, 2011; Appln. No. 2008-15373.
English Translation of Japanese Office Action dated May 8, 2012; Appln. No. 2012-015556.
Internationai Preliminary Report on Patentability dated Mar. 31, 2009; PCT/IL2006/000600.
International Preliminary Report on Patentability dated Mar. 13, 2012; PCT/IL2010/000069.
International Preliminary Report on Patentability dated Jul. 30, 2013, PCT/IL2011/000902.
International Preliminary Report on Patentability dated Jul. 30, 2013; PCT/IL2011/000903.
International Preliminary Report on Patentability dated Jul. 2, 2013; PCT/IL2010/001090.
International Preliminary Report on Patentability dated Jul. 31, 2012; PCT/IL2011/000065.
International Preliminary Report on Patentability dated Jul. 31, 2012; PCT/IL2011/000066.
International Preliminary Report on Patentability dated Nov. 27, 2012; PCT/IL2011/000076.
International Preliminary Report on Patentability dated Jul. 31, 2012; PCT/IL2011/000078.
International Search Report and Written Opinion dated Jun. 18, 2008; PCT/IL06/00600.
International Search Report and Written Opinion dated May 20, 2010; PCT/IL10/00069.
International Search Report and Written Opinion dated May 9, 2011; PCT/IL10/01090.
International Search Report and Written Opinion dated May 23, 2011; PCT/IL11/00065.
International Search Report and Written Opinion dated Jun. 14, 2011; PCT/IL11/00066.
International Search Report and Written Opinion dated Jun. 13, 2011; PCT/IL11/00076.
International Search Report and Written Opinion dated May 24, 2011; PCT/IL11/00077.
International Search Report and Written Opinion dated May 25, 2011; PCT/IL11/00078.
International Search Report and Written Opinion dated Nov. 15, 2011; PCT/IL11/00408.
International Search Report and Written Opinion dated Apr. 13, 2012; PCT/IL11/00903.
International Search Report and Written Opinion dated Sep. 21, 2012; PCT/IL2012/000147.
International Search Report and Written Opinion dated Aug. 31, 2012; PCT/IL2012/000163.
International Search Report and Written Opinion dated Oct. 1, 2012; PCT/IL2012/000240.
International Search Report and Written Opinion dated Mar. 28, 2014; PCT/IL2013/050921.
USPTO NFOA dated Sep. 7, 2007 in connection with U.S. Appl. No. 11/258,256.
USPTO FOA dated Aug. 1, 2008 in connection with U.S. Appl. No. 11/258,256.
USPTO NFOA dated Dec. 11, 2008 in connection with U.S. Appl. No. 11/258,256.
USPTO FOA dated Apr. 24, 2009 in connection with U.S. Appl. No. 11/258,256.
USPTO AA dated Jul. 6, 2009 in connection with U.S. Appl. No. 11/258,256.
USPTO NOA dated Aug. 10, 2009 in connection with U.S. Appl. No. 11/258,256.
USPTO NFOA dated Oct. 31, 2008 in connection with U.S. Appl. No. 11/635,736.
USPTO NFOA dated Dec. 14, 2010 in connection with U.S. Appl. No. 11/786,522.
USPTO Examiner Interview Summary dated Feb. 9, 2011 in connection with U.S. Appl. No. 11/786,522.

(56) References Cited

OTHER PUBLICATIONS

USPTO FOA dated Apr. 18, 2011 in connection with U.S. Appl. No. 11/786,522.
USPTO NFOA dated Mar. 13, 2012 in connection with U.S. Appl. No. 11/786,522.
USPTO FOA dated May 22, 2013 in connection with U.S. Appl. No. 11/786,522.
USPTO NFOA dated Jul. 10, 2013 in connection with U.S. Appl. No. 11/786,522.
USPTO NFOA dated Jul. 9, 2010 in connection with U.S. Appl. No. 11/789,884.
USPTO FOA dated Dec. 14, 2010 in connection with U.S. Appl. No. 11/789,884.
USPTO Examiner Interview Summary dated Feb. 24, 2011 in connection with U.S. Appl. No. 11/789,884.
USPTO AA dated Mar. 24, 2011 in connection with U.S. Appl. No. 11/789,884.
USPTO Examiner Interview Summary dated May 2, 2011 in connection with U.S. Appl. No. 11/789,884.
USPTO NOA dated Apr. 12, 2012 in connection with U.S. Appl. No. 11/789,884.
USPTO NFOA dated Sep. 16, 2010 in connection with U.S. Appl. No. 11/871,028.
USPTO FOA dated Apr. 28, 2011 in connection with U.S. Appl. No. 11/871,028.
USPTO NFOA dated Apr. 25, 2012 in connection with U.S. Appl. No. 12/498,675.
USPTO FOA dated Jan. 25, 2013 in connection with U.S. Appl. No. 12/498.675.
USPTO NFOA dated Aug. 28, 2012 in connection with U.S. Appl. No. 12/673,691.
USPTO NFOA dated Apr. 16, 2013 in connection with U.S. Appl. No. 12/673,691.
USPTO NFOA dated Jul. 5, 2012 in connection with U.S. Appl. No. 12/772,450.
USPTO NFOA dated Jun. 22, 2012 in connection with U.S. Appl. No. 12/814,807.
USPTO FOA dated Mar. 4, 2013 in connection with U.S. Appl. No. 12/814,807.
USPTO NOA dated Jul. 12, 2013 in connection with U.S. Appl. No. 12/814,807.
USPTO NFOA dated Jul. 10, 2012 in connection with U.S. Appl. No. 12/861,059.
USPTO FOA dated Dec. 24, 2012 in connection with U.S. Appl. No. 12/861,059.
USPTO AA dated Mar. 1, 2013 in connection with U.S. Appl. No. 12/861,059.
USPTO NFOA dated Jun. 26, 2013 in connection with U.S. Appl. No. 12/861,059.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO FOA dated Feb. 14, 2013 in connection with U.S. Appl. No. 13/014,762.
USPTO AA dated Aug. 30, 2013 in connection with U.S. Appl. No. 13/014,762.
USPTO RR dated Nov. 21, 2012 in connection with U.S. Appl. No. 13/106,023.
USPTO NFOA dated Mar. 1, 2013 in connection with U.S. Appl. No. 13/106,023.
USPTO NOA dated May 15, 2013 in connection with U.S. Appl. No. 13/106,023.
USPTO NFOA dated Jan. 15, 2013 in connection with U.S. Appl. No. 13/159,903.
USPTO NFOA dated Sep. 19, 2012 in connection with U.S. Appl. No. 13/303,826.
USPTO FOA dated Mar. 25, 2013 in connection with U.S. Appl. No. 13/303,826.
USPTO AA dated Jun. 7, 2013 in connection with U.S. Appl. No. 13/303,826.
USPTO NFOA dated Apr. 4, 2013 in connection with U.S. Appl. No. 13/378,115.
USPTO FOA dated Sep. 6, 2013 in connection with U.S. Appl. No. 13/378,115.
USPTO NFOA dated Jan. 16, 2013 in connection with U.S. Appl. No. 13/413,748.
USPTO FOA dated Jul. 2, 2013 in connection with U.S. Appl. No. 13/413,748.
An Office Action dated Jun. 5, 2017, which issued during the prosecution of Chinese Patent Application No. 2013800755734.

\* cited by examiner

SYSTEMS AND METHODOLOGIES FOR CONTROLLING ACCESS TO A FILE SYSTEM

REFERENCE TO RELATED APPLICATIONS

Reference is made to the following patents and patent applications, owned by assignee, the disclosures of which are hereby incorporated by reference:

U.S. Pat. Nos. 7,555,482 and 7,606,801;

U.S. Published Patent Application Nos.: 2007/0244899, 2008/0271157, 2009/0100058, 2009/0119298; 2009/0265780; 2011/0010758; 2011/0060916; 2011/0061093, 2011/0061111, 2011/0184989, 2011/0296490 and 2012/0054283; and U.S. patent application Ser. Nos.: 13/106,023; 13/159,903; 13/303,826 and 13/413,748.

FIELD OF THE INVENTION

The present invention relates generally to computer-implemented systems and methodologies for controlling access to a file system having data elements.

BACKGROUND OF THE INVENTION

Access permissions to elements of a file system in an enterprise are typically granted and revoked to an individual based on the role of the individual in the enterprise. Updating the access permissions to constantly correspond to ever-changing roles in an organization is a complex challenge.

SUMMARY OF THE INVENTION

The present invention seeks to provide computer-implemented systems and methodologies for controlling access to a file system having data elements.

There is thus provided in accordance with a preferred embodiment of the present invention a computer-implemented method for controlling access to a file system having data elements, including the steps of maintaining a record of respective actual accesses by users of the file system to the data elements, defining a proposed removal of a set of the users from a superset of the users, wherein members of the superset have common access privileges to a portion of the data elements, and wherein following an implementation of the proposed removal, members of the set retain respective proposed residual access permissions to the data elements, automatically ascertaining, prior to the implementation of the proposed removal, that at least one of the respective actual accesses are disallowed to the members of the set, or to non-members of the set having actual access profiles which are similar to the actual access profiles of the members of the set, by the respective proposed residual access permissions, and generating an error indication, responsively to the step of automatically ascertaining.

Preferably, the data elements include files and directories, the file system includes a hierarchy of the files and directories, and the portion of the data elements includes a first directory and all of the files and directories below the first directory in the hierarchy.

Preferably, the users have memberships in respective alternative user groups, each of the alternative user groups having group permissions to access respective alternative portions of the data elements, wherein the respective proposed residual access permissions of the users include the group permissions of the alternative user groups. Preferably, the step of maintaining a record includes constructing an aggregated table of unique actual accesses by the users. Preferably, the step of defining a proposed removal is performed automatically.

There is also provided in accordance with another preferred embodiment of the present invention a computer-implemented system for controlling access to a file system having data elements stored thereon, including actual access monitoring functionality operable for maintaining a record of respective actual accesses by users of the file system to the data elements, user removal proposition functionality operable for defining a proposed removal of a set of the users from a superset of the users, wherein members of the superset have common access privileges to a portion of the data elements, and wherein following an implementation of the proposed removal, members of the set retain respective proposed residual access permissions to the data elements, residual access permissions ascertaining functionality operable for automatically ascertaining, prior to the implementation of the proposed removal, that at least one of the respective actual accesses are disallowed to the members of the set, or to non-members of the set having actual access profiles which are similar to the actual access profiles of the members of the set, by the respective proposed residual access permissions, and error indication generating functionality operable for generating an error indication, responsively to the step of automatically ascertaining.

Preferably, the data elements include files and directories, the file system includes a hierarchy of the files and directories, and the portion of the data elements includes a first directory and all of the files and directories below the first directory in the hierarchy.

Preferably, the users have memberships in respective alternative user groups, each of the alternative user groups having group permissions to access respective alternative portions of the data elements, wherein the respective proposed residual access permissions of the users include the group permissions of the alternative user groups.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
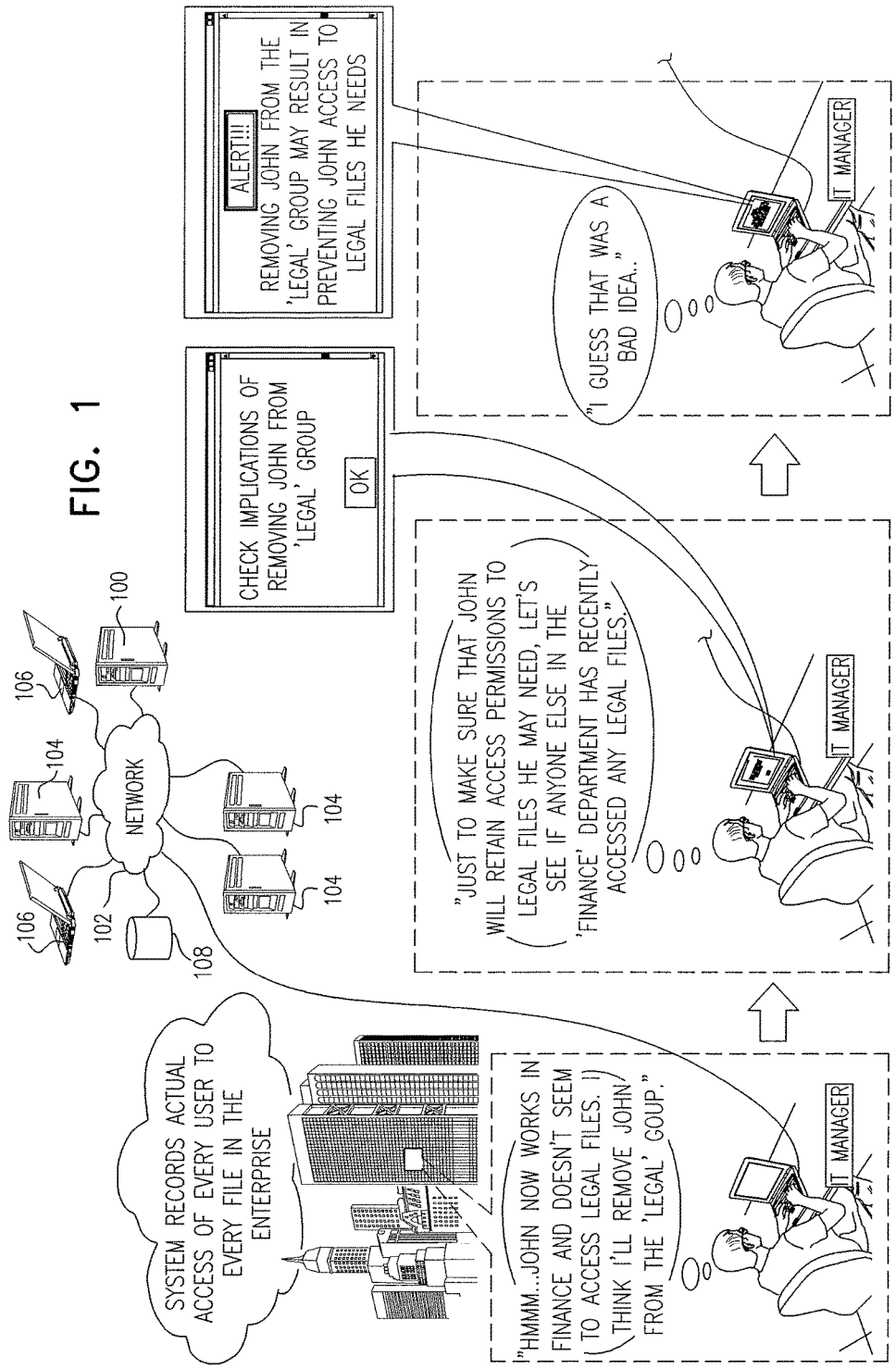
FIG. 1 is a simplified pictorial illustration of an example of steps in the operation of a method for controlling access to a file system having data elements stored thereon, operative in accordance with a preferred embodiment of the present invention.

Reference is now made to FIG. 1, which is a simplified pictorial illustration of an example of steps in the operation of a method for controlling access to a file system having data elements stored thereon, operative in accordance with a preferred embodiment of the present invention.

The method illustrated in FIG. 1 is preferably implemented by a system which typically resides on a server 100 connected to an enterprise-wide computer network 102 having disparate servers 104 and computers 106 connected thereto. Network 102 preferably also comprises a multiplicity of storage resources 108, which typically reside within servers 104 and\or computers 106.

The system of server 100 preferably continuously monitors network 102 to automatically maintain a record of respective actual accesses by users of the file system to data elements stored on storage resources 108.

It is appreciated that access permissions of users to data elements in an enterprise network are typically controlled by controlling membership of the users to user groups, which user groups have access permissions to the data elements. In the example of FIG. 1, a 'legal' user group may have access permissions to files containing legal information, and a 'finance' user group may have access permissions to files containing finance related information.

As shown in FIG. 1, an IT Manager of network 102 of a company utilizes the system of server 100 to ascertain that John, a former employee of the legal department of the company and a current employee of the finance department of the company, has not recently accessed legal files, while retaining membership to the 'legal' user group. Therefore, the IT Manager further utilizes the system of server 100 to propose the removal of John from the 'legal' user group, which removal may potentially revoke access permissions from John to legal files to which members of the 'legal' user group have access permissions, and to which John may require access to in the future.

It is appreciated that John may be a member of additional user groups having access permissions to the legal files, and it is therefore appreciated that even after implementing the proposed removal of John from the 'legal' user group, John may still retain residual access permissions to the legal files.

As further shown in FIG. 1, the IT Manager further queries the system of server 100 to automatically ascertain, prior to the implementation of the proposed removal, that following the implementation of the proposed removal, John will retain residual access permissions to files to which he may require access.

It is a particular feature of this embodiment of the present invention that in order to ascertain whether, following the implementation of a proposed removal of a first member of a user group from the user group, the first member will retain residual access permissions to files to which he may need access to, it typically suffices to ascertain whether after a removal of at least one other member of the user group, which at least one other member has an actual access profile similar to that of the first member, the at least one other member will retain residual access permissions to files to which he has recently actually accessed. For the purposes of the present application, the term "actual access profile" is defined as the collection of recent actual file accesses of a particular user. A detailed description of a method for ascertaining similarity between actual access profiles is described in detail in U.S. Pat. No. 7,606,801 of the applicants, incorporated by reference herein.

It is therefore appreciated that with regard to the example of FIG. 1, in order to ascertain which files John will continue to require access to, the system of server 100 is operative to ascertain which files users having actual access profiles that are similar to John's actual access profile have recently actually accessed. In the example of FIG. 1, users having actual access profiles that are similar to John's actual access profile may be, for example, employees of the finance department.

Alternatively, in order to ascertain whether, following the implementation of a proposed removal of a member of a user group from the user group, the member will retain residual access permissions to files to which he may need access to, the system of server 100 may ascertain whether after the removal of the member from the user group, the member will retain residual access permissions to files to which he has recently actually accessed. A detailed description of this method is described in detail in U.S. Published Patent Application 2008/0271157 of the applicants, incorporated by reference herein.

As further shown in FIG. 1, responsive to the IT manager querying the system of server 100, the IT Manager receives an alert from the system of server 100, notifying the IT Manager that revoking John's membership from the 'legal' group may result in revoking access permissions from John to files which he may need access to. It is appreciated that in order to ascertain whether revoking a user's membership from a group may result in denying the user access to files which he may need, the system of server preferably ascertains whether revoking membership of a similar user from the group would result in revoking access permissions from the similar user to files which the similar user has recently actually accessed.

Figure 2:
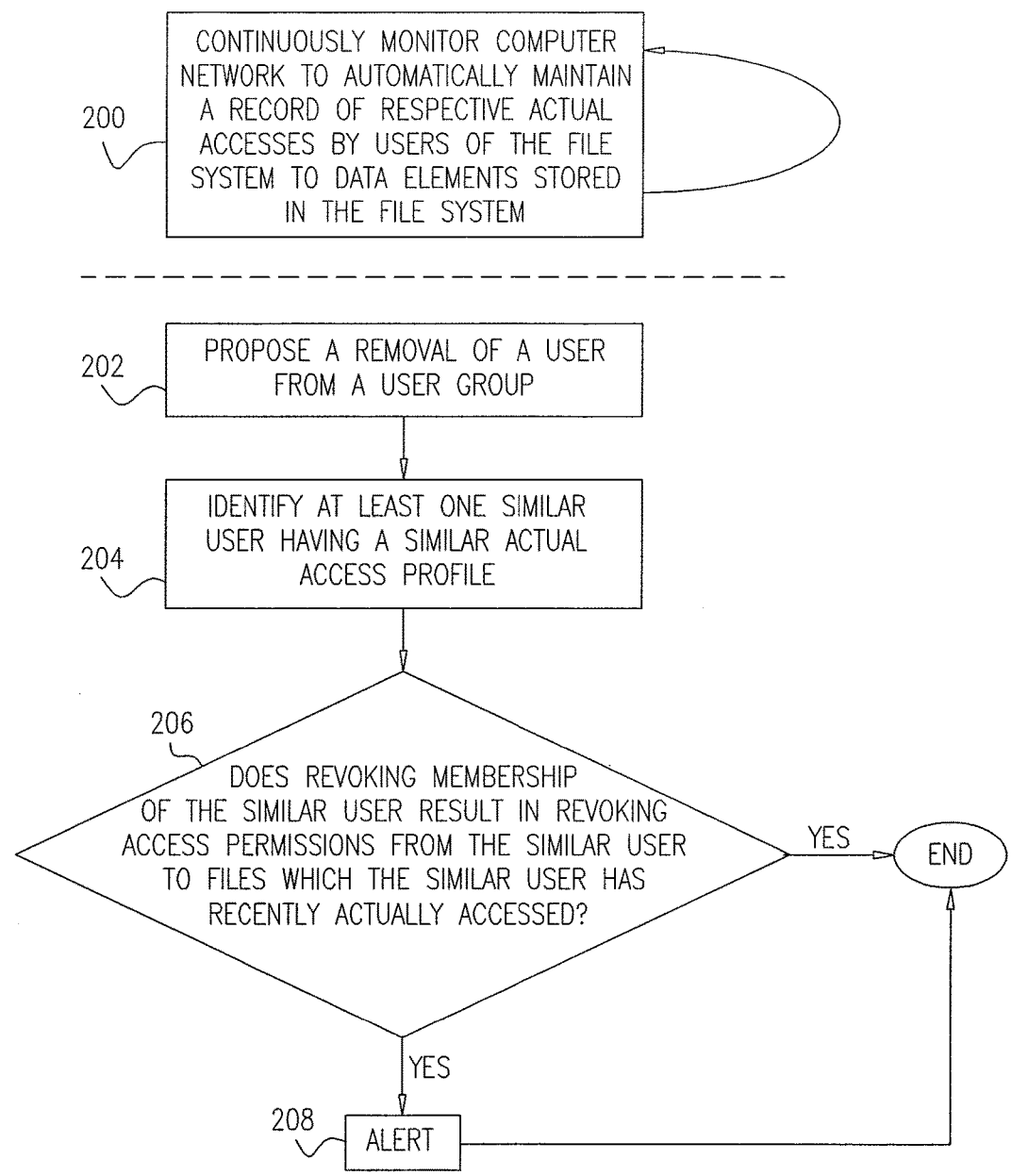
FIG. 2 is a simplified block diagram illustration of steps in the operation of the method of FIG. 1.

Reference is now made to FIG. 2, which is a simplified block diagram illustration of steps in the operation of the method of FIG. 1. As shown in FIG. 2, the method comprises continuously monitoring a computer network to automatically maintain a record of respective actual accesses by users of the file system to data elements stored in the file system (200).

Preferably, the method also includes proposing a removal of a user from a user group (202). After identifying at least one similar user having an actual access profile which is similar to the actual access profile of the user (204), the method includes ascertaining whether revoking membership of the similar user would result in revoking access permissions from the similar user to files which the similar user has recently actually accessed (206). If revoking membership of the similar user would result in revoking access permissions from the similar user to files which the similar user has recently actually accessed, the method includes providing an alert stating that revoking the user's membership from the group may result in revoking access permissions from the user to files which he may need access to (208).

Figure 3:
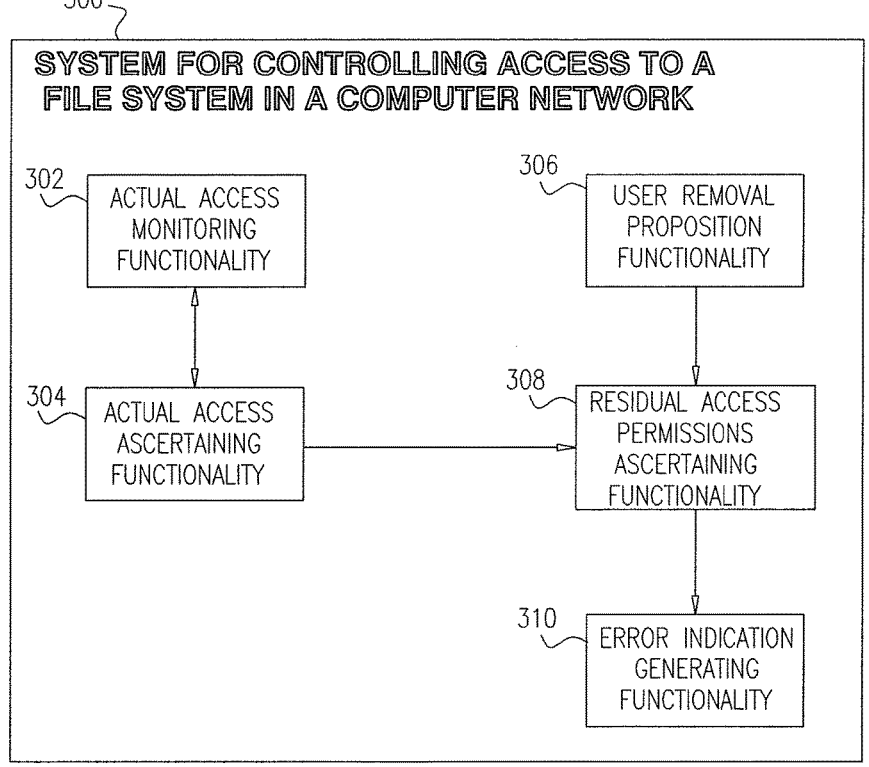
FIG. 3 is a simplified block diagram illustration of a system for controlling access to a file system having data elements stored thereon, constructed and operative in accordance with preferred embodiments of the present invention.

Reference is now made to FIG. 3, which is a simplified block diagram illustration of a system 300 for controlling access to a file system in a computer network, the file system having data elements stored thereon, the system being constructed and operative in accordance with preferred embodiments of the present invention.

Preferably, system 300 includes actual access monitoring functionality 302 operative to continuously monitor a computer network having a file system residing thereon, to automatically maintain a record of respective actual accesses by users of the file system to data elements stored thereon.

Preferably, system 300 also includes actual access ascertaining functionality 304 operative to utilize the record maintained by actual access monitoring functionality 302 to ascertain whether users have recently accessed any particular data elements. System 300 also preferably includes user removal proposition functionality 306 operable for proposing the removal of a member of a user group from the user group.

Preferably, system 300 also includes residual access permissions ascertaining functionality 308 operable to utilize information received from actual access ascertaining functionality 304 for ascertaining, prior to the implementation of a proposed removal of a member of a user group from the user group, that following the implementation of the proposed removal, the member will retain access permissions to files to which he has actually accessed in the past and to which he therefore may require access in the future.

It is a particular feature of a preferred embodiment of the present invention that system 300 that residual access permissions ascertaining functionality 308 is also operable to utilize information received from actual access ascertaining functionality 304 for ascertaining whether after a removal of at least one similar member of a user group, which at least one other similar has an actual access profile similar to that of a second group member, the at least one similar member will retain residual access permissions to files to which he has recently actually accessed, and thereby ascertaining that the second member will retain access permissions to files to which he may require access in the future.

Preferably, system 300 also includes error indication generating functionality operative to generate an error indication responsive to an output of residual access permissions ascertaining functionality 308.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A computer-implemented method for controlling access to a the system having data elements, comprising the steps of:
  maintaining a record of respective actual accesses by users of said file system to said data elements, said users being organized in a user hierarchy;
  employing entitlement review by owner functionality for automatically proposing a removal of a set of said users from a superset of said users, wherein members of said superset have common access privileges to a portion of said data elements, and wherein following an implementation of said proposed simulated removal, members of said set retain respective proposed residual access permissions to said data elements, said entitlement review by owner functionality being configured to present to at least one owner of said data elements, a visually sensible indication of authorization status including a specific indication of users which were not yet authorized by the at least one owner of said data elements, and to require the at least one owner to confirm or modify the authorization status;
  automatically ascertaining, prior to said implementation of said proposed removal, whether at least one of said respective actual accesses are disallowed to non-members of said set by said respective proposed residual access permissions, said non-members of said set having actual access profiles which are similar to the actual access profiles of said members of said set, said members of said set being nondescendants of said non-members of said set in said user hierarchy; and
  responsive to said automatically ascertaining that said at least one of said respective actual accesses are not disallowed to said non-members of said set by said respective proposed residual access permissions, obtaining a consent to said proposed removal from at least one of a data owner of said data elements and a data authorizer established to act on behalf of said data owner of said data elements.

2. A computer-implemented method according to claim 1, wherein said data elements comprise files and directories, and wherein said file system comprises a hierarchy of said files and directories, and wherein said portion of said data elements comprises:
  a first directory; and
  all of said files and directories below said first directory in said hierarchy.

3. A computer-implemented method according to claim 1, wherein said users have memberships in respective alternative user groups, each of said alternative user groups having group permissions to access respective alternative portions of said data elements, wherein said respective proposed residual access permissions of said users comprise said group permissions of said alternative user groups.

4. A computer-implemented method according to claim 1, wherein said step of maintaining a record comprises constructing an aggregated table of unique actual accesses by said users.

5. A computer-implemented method according to claim 1, wherein said step of defining a proposed removal is performed automatically.

6. A computer-implemented system comprising a non-transitory, tangible computer-readable medium in which computer program instructions are stored, which instructions, when read by a computer, cause the computer to control access to a file system having data elements stored thereon, said system comprising:
  actual access monitoring functionality operable for maintaining a record of respective actual accesses by users of said file system to said data elements, said users being organized in a user hierarchy;
  user removal proposition functionality operable for employing entitlement review by owner functionality for automatically proposing a removal of a set of said users from a superset of said users, wherein members of said superset have common access privileges to a portion of said data elements, and wherein following an implementation of said proposed simulated removal, members of said set retain respective proposed residual access permissions to said data elements, said entitlement review by owner functionality being configured to present to at least one owner of said data elements, a visually sensible indication of authorization status including a specific indication of users which were not yet authorized by the at least one owner of said data elements, and to require the at least one owner to confirm or modify the authorization status;
  residual access permissions ascertaining functionality communicating with said actual access monitoring functionality and with said user removal proposition functionality and operable:
    for automatically ascertaining, prior to said implementation of said proposed removal proposed by said user removal proposition functionality, whether at least one of said respective actual accesses recorded by said actual access monitoring functionality are disallowed to non-members of said set by said respective proposed residual access permissions, said non-members of said set having actual access profiles which are similar to the actual access profiles of said members of said set, said members of said set being nondescendants of said non-members of said set in said user hierarchy; and responsive to said automatically ascertaining that said at least one of said respective actual accesses are not disavowed to said non-members of said set by said respective proposed residual access permissions, for obtaining a consent to said proposed removal from at least one of a data owner of said data elements and a data authorizer established to act on behalf of said data owner of said data elements.

7. A computer-implemented system of claim 6, wherein said data elements comprise files and directories, and wherein said file system comprises a hierarchy of said files and directories, and wherein said portion of said data elements comprises:

a first directory; and all of said files and directories below said first directory in said hierarchy.

8. A computer-implemented system of claim 6 and wherein said users have memberships in respective alternative user groups, each of said alternative user groups having group permissions to access respective alternative portions of said data elements, wherein said respective proposed residual access permissions of said users comprise said group permissions of said alternative user groups.

\* \* \* \* \*